(12) United States Patent  
Øvland

(10) Patent No.: US 9,057,244 B2  
(45) Date of Patent: Jun. 16, 2015

(54) FLOW CONTROL DEVICE AND FLOW CONTROL METHOD

(75) Inventor: Sigbjørn Øvland, Porsgrunn (NO)

(73) Assignee: STATOIL PETROLEUM ASA, Stavanger (NO)

( * ) Notice: Subject to any disclaimer, the term of this patent is extended or adjusted under 35 U.S.C. 154(b) by 1052 days.

(21) Appl. No.: 13/127,757

(22) PCT Filed: Nov. 6, 2009

(86) PCT No.: PCT/NO2009/000385  
§ 371 (c)(1),  
(2), (4) Date: Jul. 14, 2011

(87) PCT Pub. No.: WO2010/053378  
PCT Pub. Date: May 14, 2010

(65) Prior Publication Data  
US 2011/0290326 A1 Dec. 1, 2011

(30) Foreign Application Priority Data

Nov. 6, 2008 (NO) .................................... 20084668

(51) Int. Cl.  
*F16K 17/38* (2006.01)  
*E21B 34/08* (2006.01)  
*E21B 43/12* (2006.01)  
(Continued)

(52) U.S. Cl.  
CPC ................ *E21B 34/08* (2013.01); *E21B 43/12* (2013.01); *E21B 47/065* (2013.01); *F16K 31/002* (2013.01)

(58) Field of Classification Search  
USPC ............................... 236/88; 335/146; 137/468  
See application file for complete search history.

(56) References Cited

U.S. PATENT DOCUMENTS

| 4,005,726 A | 2/1977 | Fowler |
| 4,303,196 A | 12/1981 | Raines et al. |
| 4,347,201 A | 8/1982 | Sagawa et al. |

(Continued)

FOREIGN PATENT DOCUMENTS

| GB | 2169018 A | 7/1986 |
| RU | 2 334 101 C1 | 9/2008 |

(Continued)

OTHER PUBLICATIONS

White et al., "Controlling flow in horizontal wells", WORLD OIL, vol. 121, Nov. 1991, (6 pages).

*Primary Examiner* — Jonathan Bradford  
(74) *Attorney, Agent, or Firm* — Birch, Stewart, Kolasch & Birch, LLP

(57) ABSTRACT

A method for reversible temperature sensitive control of the flow of fluid in oil and/or gas production, involves a control device or an autonomous valve operating by the Bernoulli principle and includes a moveable disk or body provided within a housing for opening and closing the valve, involving use of the Curie-effect in order to position the body in a preferred position within the housing at a temperature below a certain, preferred transition or Curie temperature. An apparatus for reversible temperature sensitive control of the flow of fluid in oil and/or gas production including a control device or an autonomous valve operating by the Bernoulli principle and including a moveable disk or body provided within a housing for opening and closing the valve, the body and housing including a ferromagnetic material having a certain, preferred Curie temperature, the temperature being selected in order to position the body in a preferred position in the housing during installation or operation.

24 Claims, 7 Drawing Sheets

(51) Int. Cl.
  *E21B 47/06* (2012.01)
  *F16K 31/00* (2006.01)

(56) References Cited

U.S. PATENT DOCUMENTS

| | | |
|---|---|---|
| 4,407,448 A | 10/1983 | Yamanaka et al. |
| 4,577,691 A | 3/1986 | Huang et al. |
| 4,821,801 A | 4/1989 | Van Laar |
| 4,858,691 A | 8/1989 | Ilfrey et al. |
| 5,799,648 A | 9/1998 | Oglesby et al. |
| 2009/0229824 A1 | 9/2009 | Ocalan et al. |

FOREIGN PATENT DOCUMENTS

| | | |
|---|---|---|
| WO | WO 92/08875 A2 | 6/1992 |
| WO | WO 2008/004875 A1 | 1/2008 |
| WO | WO 2008/152348 A1 | 12/2008 |

US 9,057,244 B2

FLOW CONTROL DEVICE AND FLOW CONTROL METHOD

The present invention relates to a flow control device and a flow control method.

The present invention is based on a self adjusting or autonomous valve as disclosed in WO 2008/004875 A1 and operating by the Bernoulli principle, belonging to the applicant of the present invention.

Devices for recovering of oil and gas from long, horizontal and vertical wells are known from U.S. Pat. Nos. 4,821,801, 4,858,691, 4,577,691 and GB patent publication No. 2169018. These known devices comprise a perforated drainage pipe with, for example, a filter for control of sand around the pipe. A considerable disadvantage with the known devices for oil/and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk that of coning, i.e. flow of unwanted water or gas into the drainage pipe downstream, where the velocity of the oil flow from the reservoir to the pipe is the greatest.

From World Oil, vol. 212, N. 11 (11/91), pages 73-80, is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevent the running of work-over tools.

When extracting oil and or gas from geological production formations, fluids of different qualities, i.e. oil, gas, water (and sand) is produced in different amounts and mixtures depending on the property or quality of the formation. None of the above-mentioned, known devices are able to distinguish between and control the inflow of oil, gas or water on the basis of their relative composition and/or quality.

With the autonomous valve as disclosed WO 2008/004875 A1 is provided an inflow control device which is self adjusting or autonomous and can easily be fitted in the wall of a production pipe and which therefore provide for the use of work-over tools. The device is designed to "distinguish" between the oil and/or gas and/or water and is able to control the flow or inflow of oil or gas, depending on which of these fluids such flow control is required.

The device as disclosed in WO 2008/004875 A1 is robust, can withstand large forces and high temperatures, prevents draw dawns (differential pressure), needs no energy supply, can withstand sand production, is reliable, but is still simple and very cheap.

In an embodiment of the device as disclosed in WO 2008/004875 A1 and as shown in FIG. 7 the device is provided with a thermally responsive element in the form of a bi-metallic element bending the inner disc of the device in case of temperature drops. According to the present invention a quite different technical solution of obtaining thermal response is disclosed, which does not alter the geometrical configuration of the device or its inner components and which may be favourable during installation or operation.

U.S. Pat. No. 4,347,201 discloses a process for making a temperature sensitive magnetic element, and also describes the use of such a temperature sensitive magnetic element to switch a reed switch, which in turn controls an air conditioning unit. A further example is provided in U.S. Pat. No. 4,347,201 in which the quantity of light falling on a photo-diode is controlled using such a temperature sensitive magnetic element. Each of U.S. Pat. No. 4,407,448, U.S. Pat. No. 4,303,196, U.S. Pat. No. 4,005,726 and U.S. Pat. No. 5,799,648 discloses the use of the Curie effect as the sole means of opening and closing a valve.

A method and apparatus according to the present invention is set out in independent claims 1, 8, 13 and 18. A further aspect of the present invention is set out in claim 9.

Preferred embodiments of the invention are stated in the dependent claims.

The present invention will be further described in the following by means of examples and with reference to the drawings, where:

Figure 9:
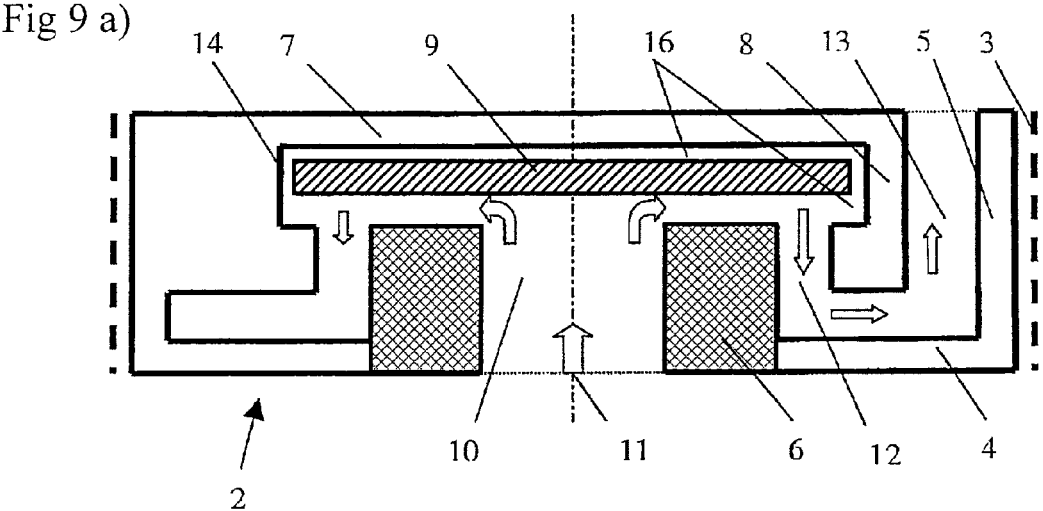
Figure 9:
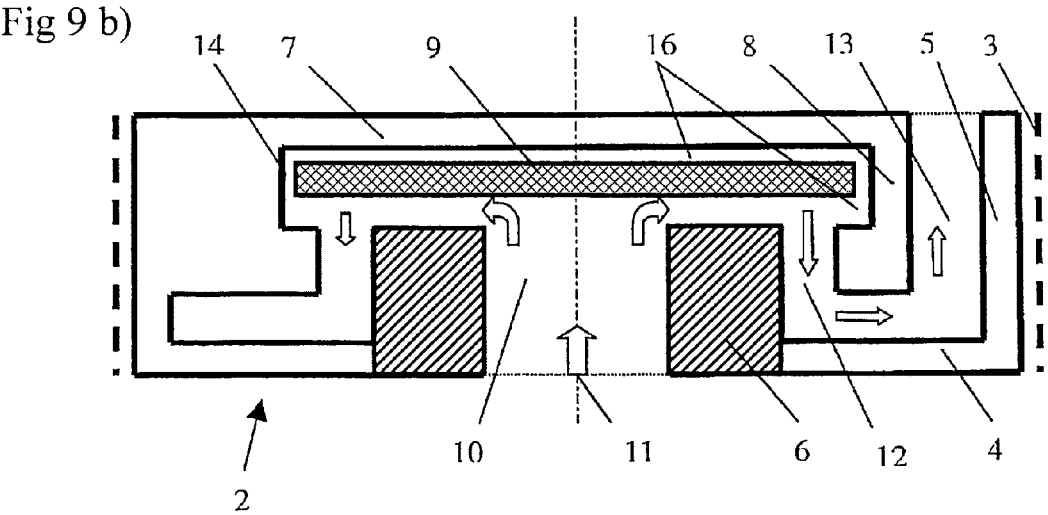

FIG. 9 *a*) shows a control device embodying the present invention in which ferromagnetic material is used to maintain the control device in a closed position below a certain temperature, *b*) shows an alternative to *a*).

Figure 10:
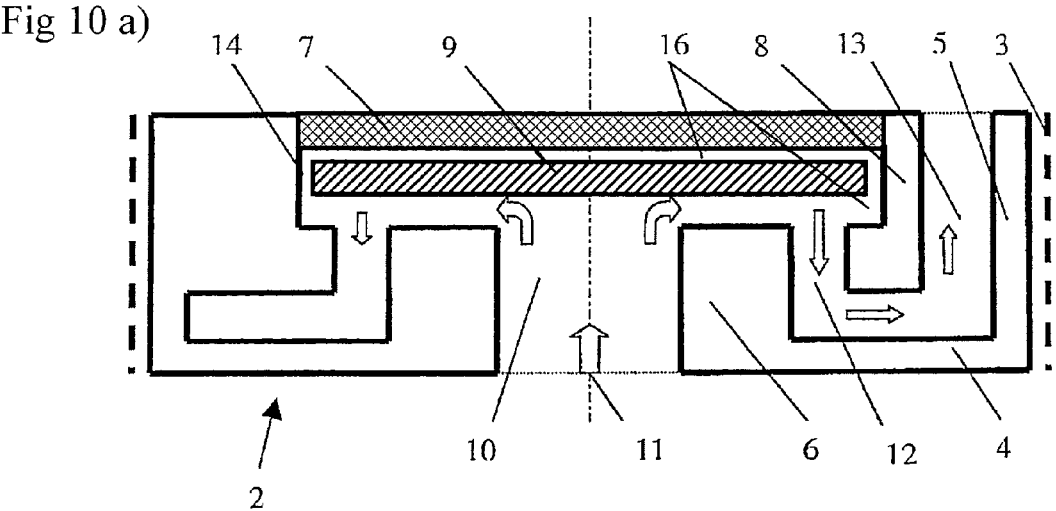
Figure 10:
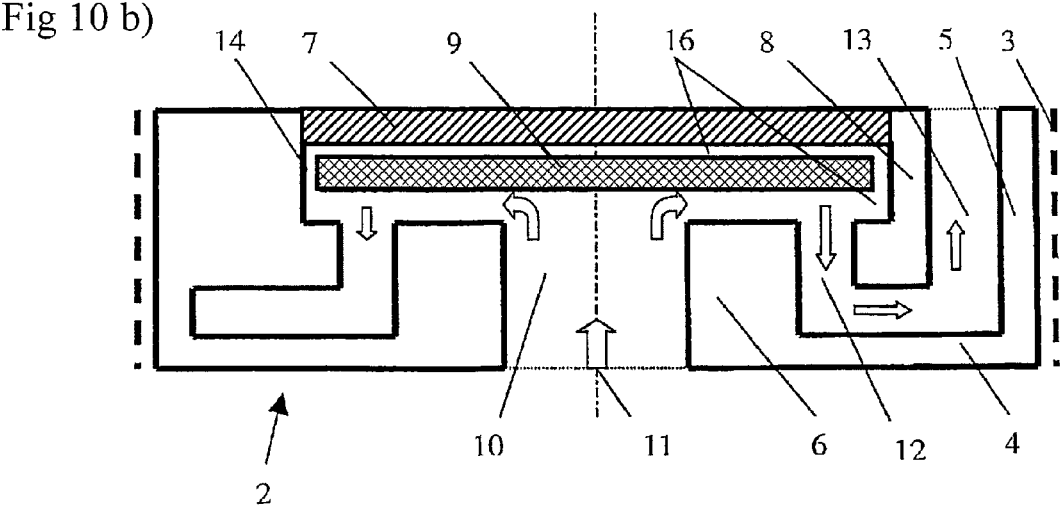

FIG. 10 *a*) shows a control device embodying the present invention in which ferromagnetic material is used to maintain the control device in an open position below a certain temperature, *b*) shows an alternative to *a*).

Figure 1:
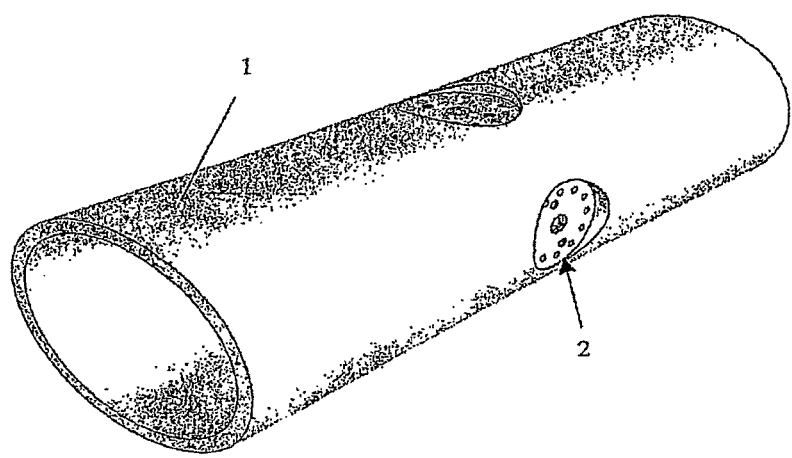
FIG. 1 shows a schematic view of a production pipe with a control device according to WO 2008/004875 A1, FIG. 2 *a*) shows, in larger scale, a cross section of the control device according to WO 2008/004875 A1, *b*) shows the same device in a top view.

FIG. 1 shows, as stated above, a section of a production pipe 1 in which a prototype of a control device 2 according to WO 2008/004875 A1 is provided. The control device 2 is preferably of circular, relatively flat shape and may be provided with external threads 3 (see FIG. 2) to be screwed into a circular hole with corresponding internal threads in the pipe or an injector. By controlling the thickness, the device 2, may be adapted to the thickness of the pipe or injector and fit within its outer and inner periphery.

Figure 2:
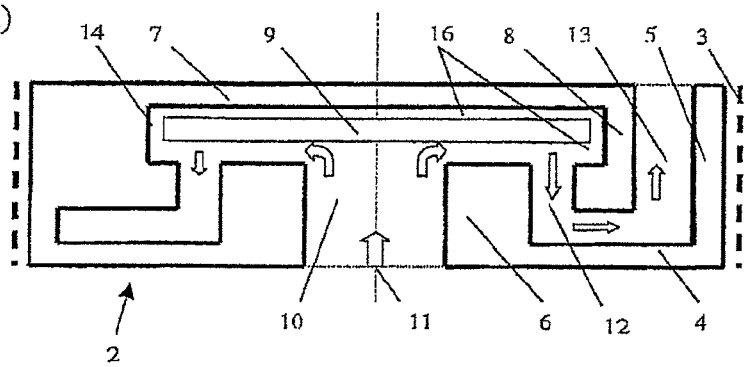
Figure 2:
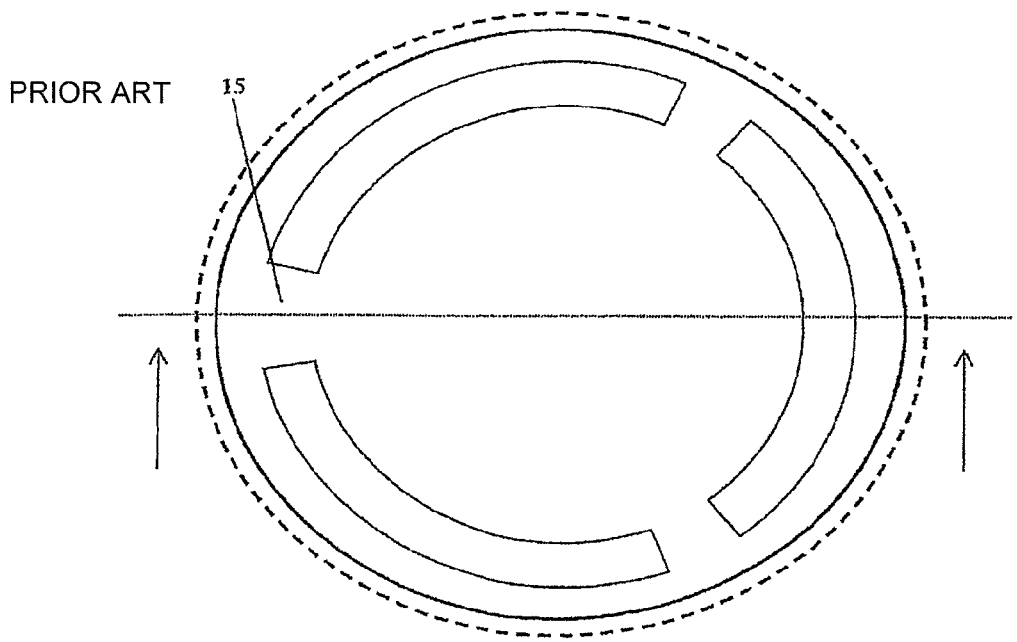

FIG. 2 *a*) and *b*) shows the prior control device 2 of WO 2008/004875 A1 in larger scale. The device consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a preferably flat disc or freely movable body 9 provided in an open space 14 formed between the first 4 and second 7 disc-shaped housing and holder bodies. The body 9 may for particular applications and adjustments depart from the flat shape and have a partly conical or semicircular shape (for instance towards the aperture 10.) As can be seen from the figure, the cylindrical segment 8 of the second disc-shaped holder body 7 fits within and protrudes in the opposite direction of the outer cylindrical segment 5 of the first disc-shaped housing body 4 thereby forming a flow path as shown by the arrows 11, where the fluid enters the control device through the central hole or aperture (inlet) 10 and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means (not further shown in the figures) at a connection area 15 as shown in FIG. 2 b).

The present invention exploits the effect of Bernoulli teaching that the sum of static pressure, dynamic pressure and friction is constant along a flow line:

$$p_{static} + \frac{1}{2}\rho v^2 + \Delta p_{friction}$$

When subjecting the disc 9 to a fluid flow, which is the case with the present invention, the pressure difference over the disc 9 can be expressed as follows:

$$\Delta p_{over} = [p_{over(P_4)} - p_{under(f(p_1,p_2,p_3))}] = \frac{1}{2}\rho v^2$$

Due to lower viscosity, a fluid such as gas will "make the turn later" and follow further along the disc towards its outer end (indicated by reference number 14). This makes a higher stagnation pressure in the area 16 at the end of the disc 9, which in turn makes a higher pressure over the disc. And the disc 9, which is freely movable within the space between the disc-shaped bodies 4, 7, will move downwards and thereby narrow the flow path between the disc 9 and inner cylindrical segment 6. Thus, the disc 9 moves down-wards or up-wards depending on the viscosity of the fluid flowing through, whereby this principle can be used to control (close/open) the flow of fluid through of the device.

Figure 3:
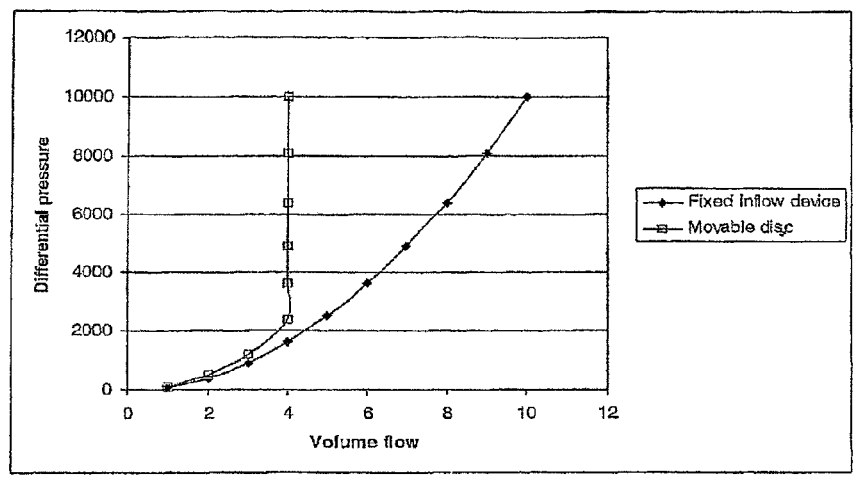
FIG. 3 is a diagram showing the flow volume through a control device according to WO 2008/004875 A1 vs. the differential pressure in comparison with a fixed inflow device.

Further, the pressure drop through a traditional inflow control device (ICD) with fixed geometry will be proportional to the dynamic pressure:

$$\Delta p = K \cdot \frac{1}{2}\rho v^2$$

where the constant, K is mainly a function of the geometry and less dependent on the Reynolds number. In the control device according to the present invention the flow area will decrease when the differential pressure increases, such that the volume flow through the control device will not, or nearly not, increase when the pressure drop increases. A comparison between a control device according to the present invention with movable disc and a control device with fixed flow-through opening is shown in FIG. 3, and as can be seen from the figure, the flow-through volume for the present invention is constant above a given differential pressure.

This represents a major advantage with the present invention as it can be used to ensure the same volume flowing through each section for the entire horizontal well, which is not possible with fixed inflow control devices.

Figure 4:
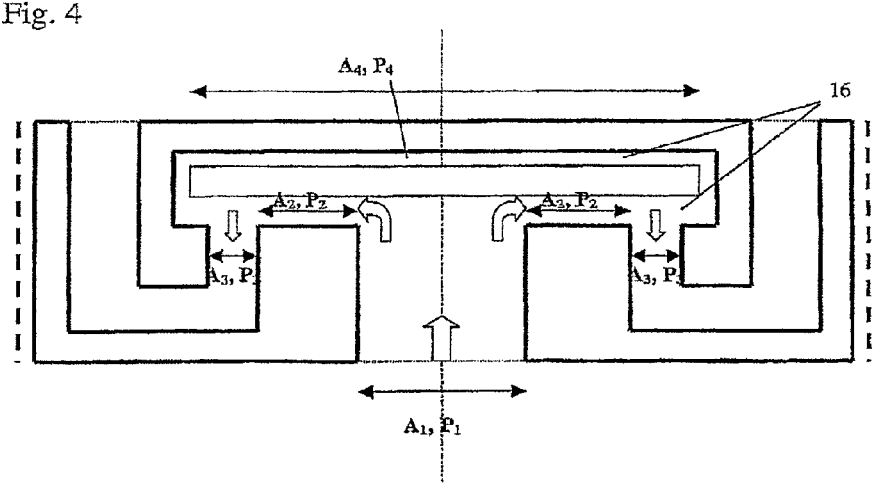
FIG. 4 shows the device shown in FIG. 2, but with the indication of different pressure zones influencing the design of the device for different applications.

When producing oil and gas the control device according to the invention may have two different applications: Using it as inflow control device to reduce inflow of water, or using it to reduce inflow of gas at gas break through situations. When designing the control device according to the invention for the different application such as water or gas, as mentioned above, the different areas and pressure zones, as shown in FIG. 4, will have impact on the efficiency and flow through properties of the device. Referring to FIG. 4, the different area/pressure zones may be divided into:

$A_1$, $P_1$ is the inflow area and pressure respectively. The force ($P_1$–$A_1$) generated by this pressure will strive to open the control device (move the disc or body 9 upwards).

$A_2$, $P_2$ is the area and pressure in the zone where the velocity will be largest and hence represents a dynamic pressure source. The resulting force of the dynamic pressure will strive to close the control device (move the disc or body 9 downwards as the flow velocity increases).

$A_3$, $P_3$ is the area and pressure at the outlet. This should be the same as the well pressure (inlet pressure).

$A_4$, $P_4$ is the area and pressure (stagnation pressure) behind the movable disc or body 9. The stagnation pressure, at position 16 (FIG. 2), creates the pressure and the force behind the body. This will strive to close the control device (move the body downwards).

Fluids with different viscosities will provide different forces in each zone depending on the design of these zones. In order to optimize the efficiency and flow through properties of the control device, the design of the areas will be different for different applications, e.g. gas/oil or oil/water flow. Hence, for each application the areas needs to be carefully balanced and optimally designed taking into account the properties and physical conditions (viscosity, temperature, pressure etc.) for each design situation.

Figure 5:
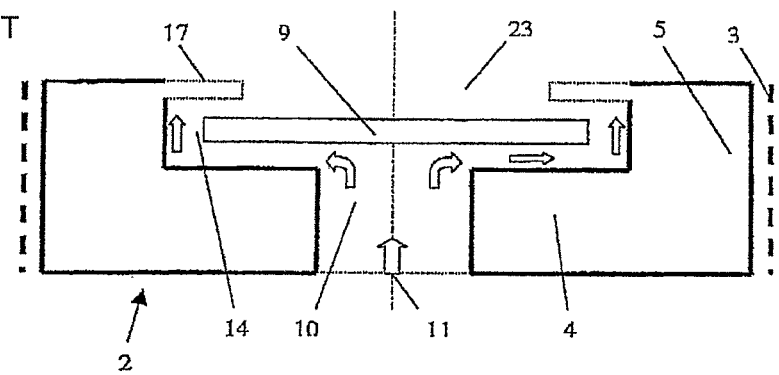
FIG. 5 shows a principal sketch of another embodiment of the control device according to WO 2008/004875 A1.

FIG. 5 shows a principal sketch of another embodiment of the control device according to WO 2008/004875 A1, which is of a more simple design than the version shown in FIG. 2. The control device 2 consists, as with the version shown in FIG. 2, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open (through a hole or holes 23, etc.) and is now only holding the disc in place, and since the cylindrical segment 5 is shorter with a different flow path than what is shown in FIG. 2, there is no build up of stagnation pressure ($P_4$) on the back side of the disc 9 as explained above in conjunction with FIG. 4. With this solution without stagnation pressure the building thickness for the device is lower and may withstand a larger amount of particles contained in the fluid.

Figure 6:
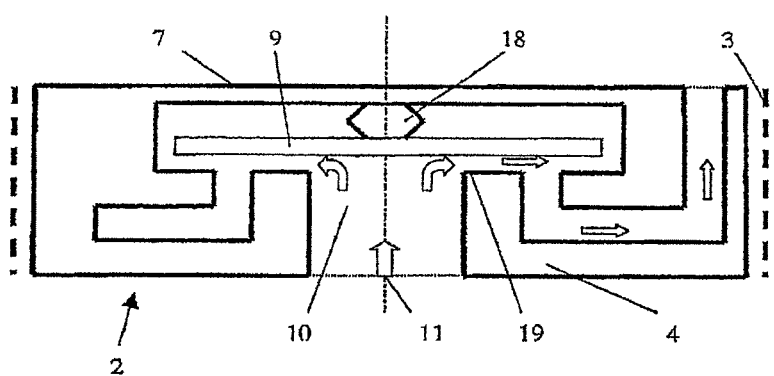
FIG. 6 shows a principal sketch of a third embodiment of the control device according to WO 2008/004875 A1.

FIG. 6 shows a third embodiment according to WO 2008/004875 A1 where the design is the same as with the example shown in FIG. 2, but where a spring element 18, in the form of a spiral or other suitable spring device, is provided on either side of the disc and connects the disc with the holder 7, 22, recess 21 or housing 4.

The spring element 18 is used to balance and control the inflow area between the disc 9 and the inlet 10, or rather the surrounding edge or seat 19 of the inlet 10. Thus, depending on the spring constant and thereby the spring force, the opening between the disc 9 and edge 19 will be larger or smaller, and with a suitable selected spring constant, depending on the inflow and pressure conditions at the selected place where the control device is provided, constant mass flow through the device may be obtained.

Figure 7:
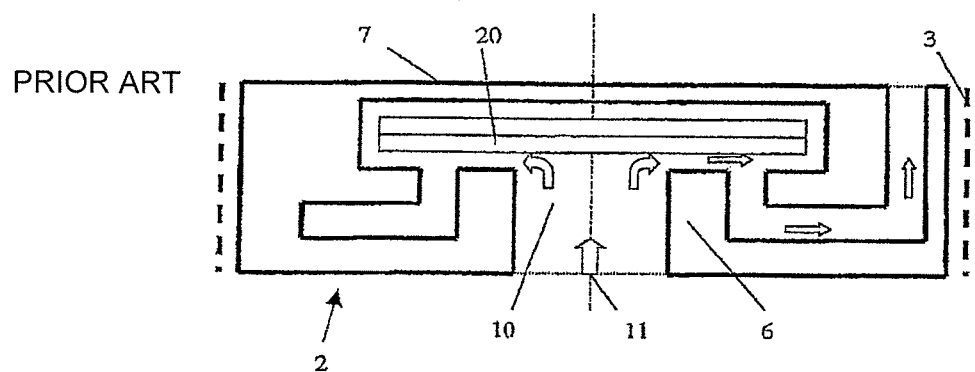
FIG. 7 shows a principal sketch of a fourth embodiment of the control device according to WO 2008/004875 A1.

FIG. 7 shows a fourth embodiment according to WO 2008/004875 A1, where the design is the same as with the example in FIG. 6 above, but where the disc 9 is, on the side facing the inlet opening 10, provided with a thermally responsive device such as bi-metallic element 20.

When producing oil and/or gas the conditions may rapidly change from a situation where only or mostly oil is produced to a situation where only or mostly gas is produced (gas breakthrough or gas coning). With for instance a pressure drop of 16 bar from 100 bar the temperature drop would correspond to approximately 20° C. By providing the disc 9 with a thermally responsive element such as a bi-metallic element as shown in FIG. 7, the disc will bend upwards or be moved upwards by the element 20 abutting the holder shaped body 7 and thereby narrowing the opening between the disc and the inlet 10 or fully closing said inlet.

Figure 8:
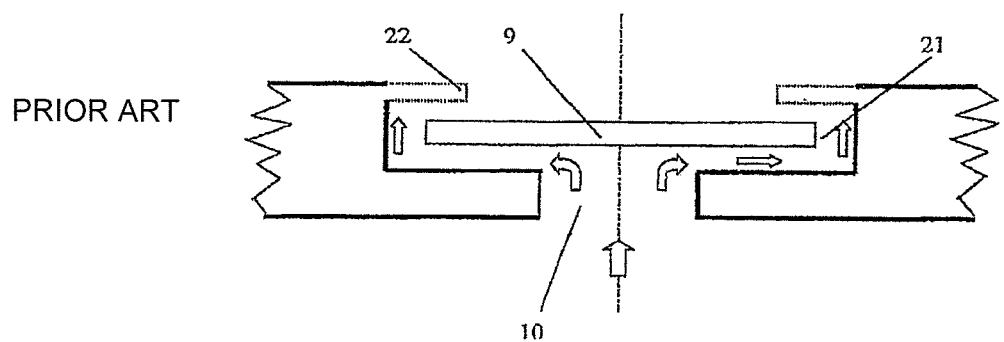
FIG. 8 shows a principal sketch of a fifth embodiment of WO 2008/004875 A1 where the control device is an integral part of a flow arrangement.

The above examples of a control device as shown in FIGS. 1 and 2 and 4-7 are all related to solutions where the control device as such is a separate unit or device to be provided in conjunction with a fluid flow situation or arrangement such as the wall of a production pipe in connection with the production of oil and gas. However, the control device may, as shown in FIG. 8, be an integral part of the fluid flow arrangement, whereby the movable body 9 may be provided in a recess 21 facing the outlet of an aperture or hole 10 of for instance a wall of a pipe 1 as shown in FIG. 1 instead of being provided in a separate housing body 4. Further, the movable body 9 may be held in place in the recess by means of a holder device such as inwardly protruding spikes, a circular ring 22 or the like being connected to the outer opening of the recess by means of screwing, welding or the like.

In all of examples described above, except for the example shown in FIG. 7 in which a bi-metallic element is provided, the movement of the disc or body 9 is solely induced by pressure and velocity. In accordance with an embodiment of the present invention, the disc 9 may be given a preferred position during installation or any time during operation or "sleep" mode by utilizing the Curie-effect, i.e. varying magnetic properties by varying temperature.

The basic inventive idea is thus to use different materials with tailored properties in the control device 2 in order to induce special movements of the disc or body 9, by utilizing said Curie-effect. The Curie temperature is a transition temperature where a ferromagnetic material loses its magnetic properties. For iron this temperature is about 770° C. For nickel the Curie temperature is 358° C. For some alloys the temperature might be in the range around room temperature (e.g. Monel—Cu/Ni alloy).

Careful selection of the disc material will give properties that force the disk or body 9 in a special position depending on the wanted effect. This effect might be one of the following:
1. Disc in Closed Position at Installation:

Choose disc 9 material that is magnetic at low temperatures and that turns non-magnetic as one reaches the temperature of the reservoir. Choose a ferromagnetic or permanent magnetic material as the valve seat 19 material that the disc 9 should bear against or "kiss".

This first case is illustrated in FIG. 9 *a*), which shows a control device 2 embodying the present invention in which ferromagnetic material is used to form the hatched and cross-hatched parts. In FIG. 9 *a*), the inner cylindrical segment 6, which defines the valve seat 19 (see FIG. 6), comprises first ferromagnetic material; this is shown in FIG. 9 *a*) as being cross hatched. The disc 9, shown as hatched in FIG. 9 *a*), comprises second ferromagnetic material.

The first ferromagnetic material has a first Curie temperature, while the second ferromagnetic material has a second Curie temperature, which may be the same as or different to the first Curie temperature. The first ferromagnetic material is a permanent magnet. The second ferromagnetic material may be, but is not required to be, a permanent magnet. The first and second ferromagnetic material may be the same.

At a temperature below both the first and second Curie temperatures, the first ferromagnetic material is magnetised, and the second ferromagnetic material (forming the disc 9) is attracted towards the first ferromagnetic material (forming the inner cylindrical segment 6) and against the valve seat 19 (see FIG. 6), such that the control device 2 is maintained in a fully closed position. The closed position is one in which fluid flow through the control device 2 is substantially prevented. When the temperature rises above the lower of the first and second Curie temperatures, for example when the flow control device 2 is in use and reaches the temperature of the reservoir, the ferromagnetic material whose Curie temperature has been exceeded loses its magnetism (or loses its magnetic properties or becomes non-magnetic), so the first and second materials are no longer attracted magnetically toward one another, and the control device 2 is therefore no longer maintained in the closed position. In this condition, the disc 9 is no longer restrained and is able to move freely again in dependence upon the fluid flow. It may be that the temperature rises above both the first and second Curie temperatures so that both the first ferromagnetic material and the second ferromagnetic material loses its magnetism; however it is only necessary that at least one of the first and second ferromagnetic material loses its magnetism at the operating (reservoir) temperature.

FIG. 9 *b*) shows an alternative to FIG. 9 *a*) in which the materials are reversed, so that the inner cylindrical segment 6, which defines the valve seat 19 (see FIG. 6), comprises the second ferromagnetic material (hatched), while the disc 9 comprises the first ferromagnetic material (cross hatched). The overall effect is the same, in that the control device 2 is maintained in a closed position at a temperature below the lower of the two Curie temperatures.

By way of example, the first ferromagnetic material may be a magnetised ferromagnetic material such as steel, nickel or some other permanent magnetic material, and may have a higher Curie temperature than the first ferromagnetic material. The second ferromagnetic material may be a Monel alloy, which would typically exhibit a Curie temperature in the range from 20 to 50° C. It will be appreciated that these are merely examples, and many other combinations of materials may be used. It is not necessary for the second material to have a Curie temperature lower than that for the first material.
2. Disc in Open Position at Installation:

Choose disc or body 9 material that is magnetic at low temperatures and that turns non-magnetic as one reach the temperature of the reservoir. Choose a ferromagnetic or permanent magnetic material as housing 4 material to keep the control device 2 open during installation.

This second case is illustrated in FIG. 10 *a*), which shows a control device 2 embodying the present invention in which ferromagnetic material is used to form the hatched and cross-hatched parts. Part of the housing marked as 7 in FIG. 10 *a*), on the opposite side of the disc 9 to the valve seat 19, comprises first ferromagnetic material (shown as being cross hatched). The disc 9 comprises second ferromagnetic material (shown as hatched).

The first ferromagnetic material has a first Curie temperature, while the second ferromagnetic material has a second Curie temperature, which may be the same as or different to the first Curie temperature. The first ferromagnetic material is a permanent magnet. The second ferromagnetic material may be, but is not required to be, a permanent magnet. The first and second ferromagnetic material may be the same.

At a temperature below both the first and second Curie temperatures, the first ferromagnetic material is magnetised, and the second ferromagnetic material (forming the disc 9) is attracted towards the first ferromagnetic material (forming the housing part marked 7), and away from the valve seat 19 (see FIG. 6), such that the control device 2 is maintained in a fully open position. The open position is one in which fluid flow through the control device 2 is substantially at a maximum. When the temperature rises above the lower of the first and second Curie temperatures, for example when the flow control device 2 is in use and reaches the temperature of the reservoir, the ferromagnetic material whose Curie temperature has been exceeded loses its magnetism (or loses its magnetic properties or becomes non-magnetic), so the first and second materials are no longer attracted magnetically toward one another, and the control device 2 is therefore no longer maintained in the open position. In this condition, the disc 9 is no longer restrained and is able to move freely again in dependence upon the fluid flow. It may be that the temperature rises above both the first and second Curie temperatures so that both the first ferromagnetic material and the second ferromagnetic material loses its magnetism; however it is only necessary that at least one of the first and second ferromagnetic material loses its magnetism at the operating (reservoir) temperature.

FIG. 10 b) shows an alternative to FIG. 10 a) in which the materials are reversed, so that the housing part 7 comprises the second ferromagnetic material (hatched), while the disc 9 comprises the first ferromagnetic material (cross hatched). The overall effect is the same, in that the control device 2 is maintained in an open position at a temperature below the lower of the two Curie temperatures.

The examples for the first and second ferromagnetic material provided above in relation to FIGS. 9 a) and 9 b) apply equally to the second case in relation to FIGS. 10 a) and 10 b).

It should also be appreciated that, in both the first and second cases, although the housing itself is showing as being formed of the ferromagnetic material, it is also possible that the housing is non magnetic and a separate ferromagnetic element is included, for example fixed to the housing in an appropriate location. However, for the purpose of this disclosure, the term "housing" should be interpreted as including structural material, which may be non magnetic, and any ferromagnetic material fixed to the structural material. In this sense, the housing comprises both the structural and the ferromagnetic material. Likewise, the disc 9 need not be comprised only of ferromagnetic material, but may for example comprise a layer of structural material and a layer of ferromagnetic material.

3. Disc in Open Position During Fluid Production:

This alternative presupposes that the disc or body 9 is cooled by the gas flow, which has to be verified. Choose a ferromagnetic or permanent magnetic material housing above the disc or body 9. Choose disc or body 9 material which when cooled by the gas flow regains it magnetic properties and therefore will open more easily.

This third case is illustrated also by FIGS. 10 a) and 10 b) described above. The gas flow lowers the temperature below the lower of the two Curie temperatures, such that both the first and second ferromagnetic material exhibit magnetic properties, and such that the control device 2 acts so as to push the disc 9 towards the part of the housing marked 7, tending to cause the flow control device 2 to remain in an open configuration, or at least open more easily.

As to the effects 1 and 2 above, these effects can also be achieved by using glue with a certain, controlled melting point, but of course without any reversible effect.

The present invention is only restricted by the appended claims, and not by the embodiments as described above. In the context of the present invention the term "oil and/or gas production" includes any process related to exploration or exploitation of oil and/or gas (e.g. installation, injection of steam, etc.) and is thus not restricted to a production mode.

For the purpose of this disclosure, it is assumed that all permanent magnets (materials that can be magnetised by an external magnetic field and which remain magnetised after the external field is removed) are ferromagnetic, so that the term "ferromagnetic material" used herein is to be interpreted as including permanent magnets. A permanent magnet is to be understood as being one that is formed of a material that is magnetised and which creates its own persistent magnetic field, in the absence of an applied external magnetic field, at least below the Curie temperature for the material. In other words, the term "permanent magnet" is used for any material that exhibits spontaneous magnetisation, that being a net magnetic moment in the absence of an external magnetic field. Permanent magnets are made from magnetically hard ferromagnetic materials that stay magnetised. The term "permanent magnet" is not to be understood as being limited to a material whose magnetism cannot be removed in any way, because external factors such as temperature and applied fields can cause a permanent magnet to lose its magnetism. The term "ferromagnetic material" used herein is also to be interpreted as encompassing ferrimagnetic material.

It will be seen that the elements of FIGS. 9 a), 9 b), 10 a) and 10 b) are depicted in the same manner as the elements in FIG. 2 a), with additional hatching and cross hatching introduced to illustrate where the described embodiments of the present invention differ from the example shown in FIG. 2 a); the same reference numerals for like parts have been used for simplicity, but it is to be understood that this is not intended to imply that the example described with reference to FIG. 2 a) embodies the present invention.

The invention claimed is:

1. A flow control device for controlling the flow of fluid from an oil and/or gas reservoir of a well into a production pipe positioned within the reservoir, the flow control device comprising a movable body provided within a housing, the movable body being arranged to adjust the flow of fluid through the control device autonomously by utilizing the Bernoulli principle, the housing comprising first ferromagnetic material having a first Curie temperature, the body comprising second ferromagnetic material having a second Curie temperature, and at least one of the first and second ferromagnetic material forming a permanent magnet, with the Curie-effect acting so as to hold the body in a predetermined position within the housing at a temperature below the lower of the first and second Curie temperatures, the predetermined position being either an open position or a closed position, and so as to allow the body to move freely at a temperature above the lower Curie temperature, said lower Curie temperature being selected in order to hold the body in the predetermined position in the housing during installation of a said production pipe comprising the flow control device into the well.

2. The flow control device as claimed in claim 1, wherein the body defines part of a flow path through the control device, wherein changes in velocity and/or composition of the fluid flowing along the flow path cause a flow-through area ($A_2$) between the body and a predetermined part of the housing to reduce or increase as a result of the Bernoulli principle, thereby acting autonomously to adjust the flow of fluid through the control device at a temperature above the lower Curie temperature.

3. The flow control device as claimed in claim 2, wherein the predetermined part of the housing forms a valve seat against which the body bears against when in the closed position.

4. The flow control device as claimed in claim 3, wherein, in the case where the predetermined position is a closed position, at least part of the housing that is on the same side of the body as the valve seat comprises the first ferromagnetic material.

5. The flow control device as claimed in claim 4, wherein the housing that forms or is adjacent to the valve seat comprises the first ferromagnetic material.

6. The flow control device as claimed in claim 3, wherein, in the case where the predetermined position is an open position, at least part of the housing that is on the opposite side of the body to the valve seat comprises the first ferromagnetic material.

7. The flow control device as claimed in claim 1, wherein the first ferromagnetic material forms a permanent magnet.

8. A method of installing a production pipe in a well, the method comprising:
   providing the production pipe having a flow control device to control the flow of fluid from an oil and/or gas reservoir of the well into the production pipe positioned within the reservoir, the flow control device comprising a movable body provided within a housing and arranged to adjust the flow of fluid through the control device autonomously by utilizing the Bernoulli principle, the housing comprising first ferromagnetic material having a first Curie temperature, the body comprising second ferromagnetic material having a second Curie temperature, and at least one of the first and second ferromagnetic material forming a permanent magnet, and the flow control device to use the Curie-effect to hold the body in a predetermined position within the housing at a temperature below the lower of the first and second Curie temperatures, the predetermined position being either an open position or a closed position, and to allow the body to move freely at a temperature above the lower Curie temperature; and
   installing the production pipe into the well, said lower Curie temperature to hold the body in the predetermined position in the housing during the installation.

9. A method of controlling the flow of fluid from an oil and/or gas reservoir of a well into a production pipe positioned within the reservoir, comprising the steps of:
   providing the production pipe with a flow control device comprising a movable body provided within a housing, the movable body being arranged to adjust the flow of fluid through the control device autonomously by utilizing the Bernoulli principle, the housing comprising first ferromagnetic material having a first Curie temperature, the body comprising second ferromagnetic material having a second Curie temperature, and at least one of the first and second ferromagnetic material forming a permanent magnet, with the Curie-effect to act so as to hold the body in a predetermined position within the housing at a temperature below the lower of the first and second Curie temperatures, the predetermined position being either an open position or a closed position, and so as to allow the body to move freely at a temperature above the lower Curie temperature;
   installing the production pipe in the well, said lower Curie temperature to hold the body in the predetermined position in the housing during the installation; and
   controlling the flow of fluid from the oil and/or gas reservoir of the well by the flow control device.

10. The method as claimed in claim 9, wherein the lower Curie temperature is chosen to be between ambient temperature and a temperature of the fluid in the reservoir, or at least one of the constituents thereof.

11. The method as claimed in claim 9, wherein at least one of the first and second ferromagnetic materials comprises ferrimagnetic material.

12. The method as claimed in claim 9, wherein the Curie-effect acts so as to tend to position the body in the predetermined position, even if it does not position the body in the predetermined position due to contrary Bernoulli-related forces acting on the body caused by fluid flow.

13. A method for reversible temperature sensitive control of the flow of fluid in oil and/or gas production, involving a control device or an autonomous valve operating by the Bernoulli principle and comprising a moveable disk or body provided within a housing for opening and closing said valve, the method comprising:
   the step of involving use of the Curie-effect in order to position said body in a position within said housing at a temperature below a certain, transition temperature or Curie temperature,
   the step of selecting a ferromagnetic material for the body and the housing which has the Curie temperature, and
   the step of selecting a material with a Curie temperature between ambient and well temperature.

14. The method in accordance with claim 13, wherein, in order to have the body in closed position at installation, further comprising the step of selecting a body material that is magnetic at low temperatures and that turns non-magnetic when reaching the temperature of the reservoir.

15. The method in accordance with claim 14, wherein the step of selecting the body material that is magnetic at low temperatures and that turns non-magnetic when reaching the temperature of the reservoir includes selecting a ferromagnetic or permanent magnetic material as valve seat material that the body should bear against.

16. The method in accordance with claim 13, wherein, in order to have the body in open position at installation, further comprising the step of selecting a body material that is magnetic at low temperatures and that turns non-magnetic when reaching the temperature of the reservoir, preferably by selecting a ferromagnetic or permanent magnetic material as housing material to keep the valve open during e.g. installation.

17. An apparatus for reversible temperature sensitive control of the flow of fluid in oil and/or gas production from a well, comprising a control device or an autonomous valve operating by the Bernoulli principle and comprising a moveable disk or body provided within a housing for opening and closing said device or valve, said body and housing comprising a ferromagnetic material having a certain Curie temperature, said temperature being selected in order to hold the body in a position in the housing during installation of a production pipe comprising the device or valve into the well.

18. The apparatus in accordance with claim 17, wherein the material is a material with a Curie temperature between ambient and well temperature.

19. The apparatus in accordance with claim 17, wherein a material selected for a valve seat is a ferromagnetic or permanent magnetic material.

20. The apparatus in accordance with claim 17, wherein the material selected for the housing is a permanent magnetic material.

21. The apparatus in accordance with claim 17, wherein the housing is an integral part of a pipe wall, in the form of a recess in said wall.

22. The apparatus in accordance with claim 17, wherein the housing is a separate housing body arranged or to be arranged in a pipe wall.

23. The apparatus in accordance with claim 17, wherein said body facing the outlet of an aperture or hole in the centre of the recess or housing body and being held in place in the recess or housing body by means of a holder device or arrangement thereby forming a flow path where the fluid enters the valve through the central aperture or inlet flowing towards and along the body and out of the recess or housing.

24. The apparatus in accordance with claim 23, wherein the shape of the body is selected from a group comprising: Conical, frustoconical, hemispherical, disc-shaped and possible variants or combinations thereof.

* * * * *